United States Patent
Champion et al.

(10) Patent No.: US 12,022,836 B2
(45) Date of Patent: Jul. 2, 2024

(54) SNACK FOOD CHIP

(71) Applicant: Frito-Lay North America, Inc., Plano, TX (US)

(72) Inventors: Alyssa Champion, Chicago, IL (US); Michael Adams, Plano, TX (US); Sathya Kalambur, Frisco, TX (US); Timothy Allen Johnson, Coppell, TX (US); David VanVlierbergen, Algonquin, IL (US)

(73) Assignee: Frito-Lay North America, Inc., Plano, TX (US)

( * ) Notice: Subject to any disclaimer, the term of this patent is extended or adjusted under 35 U.S.C. 154(b) by 133 days.

(21) Appl. No.: 17/173,968

(22) Filed: Feb. 11, 2021

(65) Prior Publication Data
US 2022/0248693 A1   Aug. 11, 2022

(51) Int. Cl.
| | |
|---|---|
| A23L 25/00 | (2016.01) |
| A21D 2/02 | (2006.01) |
| A21D 2/18 | (2006.01) |
| A21D 2/26 | (2006.01) |
| A21D 8/02 | (2006.01) |
| A21D 8/06 | (2006.01) |
| A21D 10/00 | (2006.01) |
| A21D 13/04 | (2017.01) |
| A23L 5/10 | (2016.01) |

(52) U.S. Cl.
CPC .............. *A21D 13/04* (2013.01); *A21D 2/02* (2013.01); *A21D 2/186* (2013.01); *A21D 2/263* (2013.01); *A21D 2/266* (2013.01); *A21D 8/02* (2013.01); *A21D 8/06* (2013.01); *A21D 10/005* (2013.01); *A23L 5/11* (2016.08); *A23L 25/30* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,122,198 A | 10/1978 | Wisdom et al. | |
| 4,806,377 A | 2/1989 | Ellis et al. | |
| 4,844,937 A | 7/1989 | Wilkinson | |

(Continued)

OTHER PUBLICATIONS

International Search Report and Written Opinion issued on Apr. 28, 2022 in PCT/US2022/012353.

(Continued)

*Primary Examiner* — Lien T Tran
(74) *Attorney, Agent, or Firm* — Barnes & Thornburg LLP; G. Peter Nichols (57) ABSTRACT

An organoleptically pleasing snack food chip that contains a low amount of carbohydrates, a good source of protein, and delivers a crunchy texture includes from about 15% to about 35% of almond flour; from about 20% to about 40% of a source of protein; from about 1% to about 5% of a starch; from about 0.1% to about 2% of a leavening agent; from about 20% to about 55% of oil; and has a moisture content between about 0.1% and about 3%. The almond flour may include a mixture of different types of almond flour. The source of protein may include one or more of one or more milk proteins, one or more plant proteins, and one or more seed proteins.

14 Claims, 1 Drawing Sheet

(56) References Cited

U.S. PATENT DOCUMENTS

| | | | | |
|---|---|---|---|---|
| 5,498,438 | A * | 3/1996 | Strong | A23L 25/30 |
| | | | | 426/632 |
| 8,080,273 | B2 | 12/2011 | Lykomitros et al. | |
| 8,277,858 | B2 | 10/2012 | Bows et al. | |
| 8,877,279 | B2 | 11/2014 | Emerson et al. | |
| 10,375,968 | B2 | 8/2019 | Johnson et al. | |
| 10,517,431 | B2 | 12/2019 | Barber et al. | |
| 2002/0034571 | A1 | 3/2002 | Zimmerman et al. | |
| 2007/0092619 | A1 * | 4/2007 | Ning | A21D 2/264 |
| | | | | 426/549 |
| 2011/0256277 | A1 | 10/2011 | Bows et al. | |
| 2011/0256293 | A1 | 10/2011 | Palta et al. | |
| 2012/0196010 | A1 | 8/2012 | Fuentes et al. | |
| 2014/0106049 | A1 * | 4/2014 | Fillmore | A23L 7/13 |
| | | | | 426/550 |
| 2014/0272007 | A1 | 9/2014 | Kanafani et al. | |
| 2015/0359249 | A1 * | 12/2015 | Matasovsky | A23L 19/19 |
| | | | | 426/98 |
| 2016/0143299 | A1 | 5/2016 | Cogan | |
| 2016/0143333 | A1 | 5/2016 | Cox | |
| 2017/0027200 | A1 | 2/2017 | Avashia et al. | |
| 2017/0150730 | A1 * | 6/2017 | Charrak | A21D 13/44 |
| 2019/0246653 | A1 | 8/2019 | Gladden et al. | |

OTHER PUBLICATIONS

Anonymous: "Low Carb Mozzarella Sticks—Staupitopia Zuckerfrei," Oct. 24, 2017, https://staupitopia-zuckerfrei.de/low-carb-mozzarella-sticks-rezept/ [retrieved on Apr. 12, 2022].

Anonymous: "Glutenfreie Krapfen Rezept—[Living at Home]", Jan. 15, 2016, https://www.livingathome.de/kochen-feiern/rezepte/14546-rzpt-rezept-krapfen [retrieved Apr. 19, 2022].

Anonymous: "The Best (Extra Crips!) Keto Tortilla Chips—gnom-gnom", Jan. 31, 2019, https://www.gnom-gnom.com/gluten-free-keto-tortilla-chips/ [retrieved Apr. 19, 2022].

* cited by examiner

SNACK FOOD CHIP

A snack food chip is described that provides a low amount of carbohydrates and a significant amount of protein, yet is organoleptically pleasing. The described snack food chip contains almond flour, a source of protein, starch, and a leavening agent and has a low moisture content.

BACKGROUND

A wide variety of flour-based food products, such as corn chips, tortillas, puffed dough articles, potato crisps, cookies, and crackers, among others, are currently available to customers for food consumption. These flour-based food products are frequently made from corn, wheat, potato or other starch-containing ingredients. Traditionally, such food products are first shaped, then fried and/or baked into a variety of forms.

There are a number of factors that customers consider when evaluating the desirability of flour-based food products. Some of those factors include, but are not limited to, taste, texture, size, visual appeal, nutritional value, and price, among others. As such, flour-based food products are produced in a wide variety of shapes, textures, tastes and made with varying ingredients and cooking techniques in order to appeal to a wide variety of customers.

Snack chips and crisps are typically cut into pieces in uncooked dough form, and then baked or fried to low moisture content (i.e., less than about 3%), desirably to provide crispy or crunchy chips or crisps. For example, tortilla chips are traditionally made by forming an uncooked dough, known as masa, into sheets, then baking the sheets to reduce the moisture content. The baked snack pieces are then fried in hot oil to form tortilla chips having a moisture content of less than about 3%.

Despite great popularity of such snack products, some consumers are looking for an alternative snack option to those typically high carbohydrate chip such as tortillas made from corn. However, many snack chip alternatives provide an unsatisfactory sensorial experience. Therefore, there is a need for a product that contains a low amount of carbohydrates, good source of protein, and delivers a crunchy texture.

SUMMARY

In view of the above, the following describes a snack food chip made from an uncooked dough that comprises a dry mix and water. In one embodiment the dry mix includes from about 30% to about 50% of almond flour, from about 30% to about 80% of a source of protein, from about 1% to about 10% of a starch, and from about 0.1% to about 3% of a leavening agent. In some aspects the dry mix is free of any added oil, fat, or emulsifier.

It has been discovered that the dry mix, when combined with water to form an uncooked dough for a snack chip and containing a mixture of almond flour, that the uncooked dough can be processed without special equipment to produce an organoleptically pleasing snack food chip. Accordingly, in one aspect, the almond flour includes from about 65% to about 90% of a blanched almond protein flour that contains from about 40% to about 60% protein and from about 5% to about 15% fat; from about 10% to about 20% of a fine blanched almond flour that contains from about 40% to about 60% fat and that has a particle size with at least 45% of the fine flour particles being smaller than 600 microns; and, from about 5% to about 15% a coarse blanched almond flour that contains from about 40% to about 60% fat and that has a particle size with at least 40% of the coarse flour particles being larger than 850 microns and no more than 10% of the coarse flour particles being smaller than 600 microns.

In some aspects the source of protein includes a mixture of one or more milk proteins, one or more plant proteins and one or more seed proteins. To this end, it has been found that by providing a mixture of proteins rather than proteins from a single source, it will provide the desired processing attributes and the resulting snack food will be organoleptically pleasing.

As noted above, the following also describes an uncooked snack food dough that includes from about 15% to about 40% of almond flour, from about 25% to about 45% of a source of protein, from about 1% to about 10% of starch, from about 0.1% to about 2% of a leavening agent, and, from about 25% to about 50% of water. Advantageously, it has been found that oil present in the ingredients forming the uncooked snack food dough provide a sufficient amount of oil so that the uncooked dough is pliable and can be processed yet does not contain an excessive amount oil such that oil is expressed from the dough during processing, which can lead to adverse issues. Thus, in some embodiments, the uncooked snack food dough does not contain any added oil or fat, i.e., the uncooked snack food dough is free of added oil or fat. In other embodiments, the uncooked snack food dough does not contain and is free of added emulsifiers and, in some aspects, the uncooked snack food dough does not contain and is free of added oils, fats, and emulsifiers.

In another embodiment, the snack food chip includes from about 15% to about 35% of almond flour, from about 20% to about 40% of a source of protein, from about 1% to about 5% of a starch, from about 0.1% to about 2% of a leavening agent, and, from about 20% to about 55% of oil. One of skill will appreciate that the oil content of the snack food chip includes oil picked up during frying and oil expressed from the ingredients such as the almond flour and, in this instance it does not include any oil that may be used to adhere seasoning to the snack food chip. The snack food chip has a moisture content between about 0.1% and 3%. In some aspects the snack food chip contains, per serving (28 grams), less than about 6 grams net carbohydrates and from about 5 to about 15 grams of protein. The term "net carbohydrates" is the amount of total carbohydrate minus the amount of dietary fiber.

In another embodiment, the snack food chip may include seasoning and when seasoning is present, the seasoned snack food chip includes from about 15% to about 35% of almond flour, from about 20% to about 40% of a source of protein, from about 1% to about 5% of a starch, from about 0.1% to about 2% of a leavening agent, and, from about 20% to about 55% oil and an amount of seasoning from about 5% to about 15%.

In another aspect, a method of making a snack food chip includes the following sequential steps; providing an uncooked dough that includes from about 15% to about 40% of almond flour; from about 25% to about 45% of a source of protein; from about 1% to about 10% of starch; from about 0.1% to about 2% of a leavening agent; and, from about 25% to about 50% of water. The uncooked dough is sheeted and cut to form an uncooked dough sheet having pieces such that ten pieces weigh between about 18 gm to about 30 gm. Thereafter, the uncooked dough sheet is partially cooked at a temperature between about 250° F. and about 650° F. for a period of time between about 1 second and about 60 seconds to form a partially cooked product and then the partially cooked product is fried in oil at a temperature between about between about 300° F. and about 400° F. for a period of time between about 1 second and about 60 seconds to provide a snack food chip having a moisture content less than about 3% and an oil content less than about 55%.

In some aspects, the partially cooked product is fried in oil. In one embodiment, the oil may be high in monounsaturated fats, i.e., a high oleic oil. In other words, the oil may be high in unsaturated fat, low in saturated fat, with little to no trans fats.

The described snack foods can be any suitable type of snack food and in some embodiments, the snack food resembles the well-known corn tortilla chip whether in its characteristic triangular shape, the known round shape, scoops, strips, or any other shape. In some instances the described snack foods may contain the characteristic bubbly appearance in known tortilla chips.

All percentages used or recited in this description refer to a percent by weight, unless specifically stated otherwise. Other aspects and advantages of the described snack food and method of making the snack food will be appreciated from the following detailed description.

BRIEF DESCRIPTION OF THE DRAWINGS

The following description accompanies the drawings, all given by way of non-limiting examples that may be useful to understand how the described process and system may be embodied.

DETAILED DESCRIPTION

Figure 1:
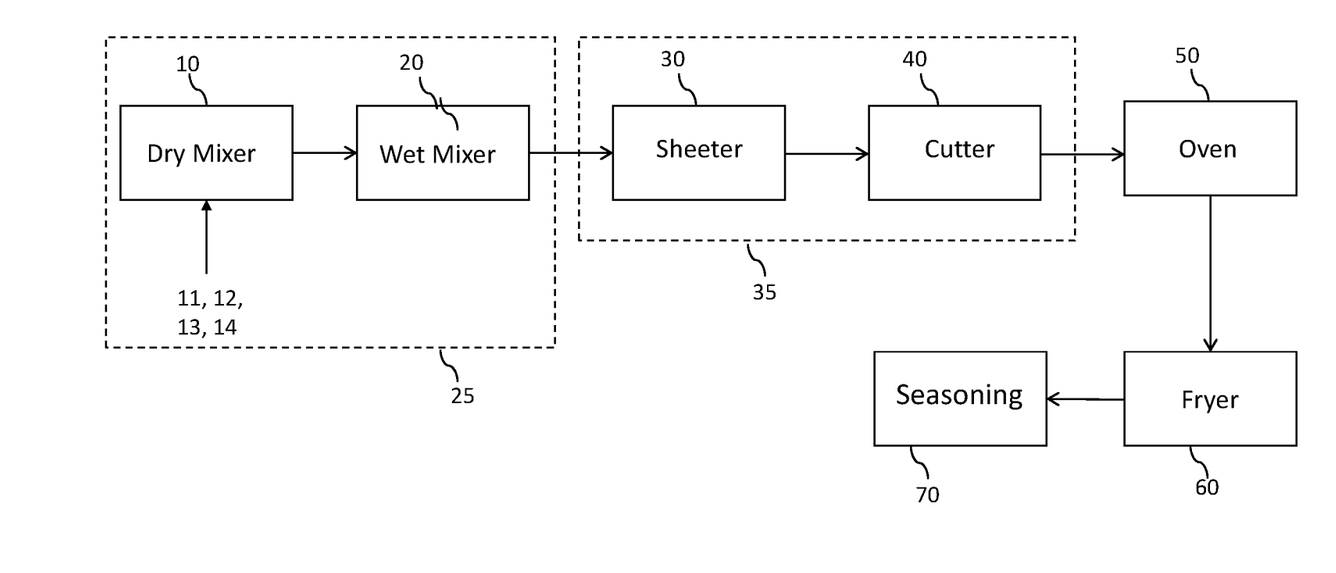
FIG. 1 is a schematic diagram of a method of making the described snack food according to one embodiment.

Referring to FIG. 1, a method of making snack food chips includes, combining raw ingredients in a dry mixer 10 conveying the combined raw ingredients to a wet mixer 20 where water is added to form an uncooked snack food dough. As indicated by reference numeral 25 in FIG. 1, the mixing of dry ingredients and subsequent addition of water to the mix of dry ingredients may occur in the same apparatus to form an uncooked snack food dough. The uncooked snack food dough is sheeted 30 and either simultaneously or subsequently, cut into pieces by cutter 40. Thereafter, the sheeted uncooked snack food dough is dried 50 in, for example, an oven, to reduce the moisture content and to form a partially cooked product. The partially cooked product is then fried 60 in oil and then may optionally be seasoned 70 before packaging. The method will now be described in more detail.

Raw materials are added to the dry mixer 10. In that regard, almond flour 11, a source of protein 12, a starch 13, and a leavening agent 14 are combined and thoroughly mixed to form a dry mix. The dry mix includes from about 30% to about 50% of almond flour; from about 30% to about 80% of a source of protein; from about 1% to about 10% of a starch; and from about 0.1% to about 3% of a leavening agent.

In some aspects, the almond flour is present in the dry mix in an amount from about 35% to about 45%, or from about 40% to about 43%, or from about 41% to about 42%. In some aspects, the source of protein is present in the dry mix in an amount from about 40% to about 60%, or from about 45% to about 55%, or from about 50% to about 55%, or from about 52% to about 53%. In some aspects the starch is present in the dry mix in an amount from about 2% to about 8%, or from about 3% to about 7%, or from about 4% to about 6%, or about 5%. In some aspects, the leavening agent is present in the dry mix in an amount from about 0.3% to about 2%, or from about 0.5% to about 1%, or about 0.7%.

To provide an organoleptically pleasing snack food with a desired texture and hardness, it has been found that it is useful if the almond flour is a mixture of almond flours that provide a balance of fat and particle size. In some instances it has been found that the described mixture of almond flours with the described differing particle sizes helps to achieve the desired characteristic blistering of known tortilla snack chips. To that end, the almond flour includes three different types of almond flour; a blanched defatted almond protein flour, a fine blanched almond flour, and a coarse blanched almond flour. It is thought that by providing defatted almond protein flour in combination with non-defatted almond flour that the dry mix will contain an appropriate amount of oil such that neither the dry mix nor the uncooked snack food dough need to contain an oil or emulsifier in order to effectively and efficiently process the dough to provide an organoleptically pleasing snack food chip. In addition, it has been found that, by providing a mixture of non-defatted almond flour with a fine particle size and a coarse particle size, the resulting snack food will have a suitable texture (bubbles and crunchiness) and hardness that may not be achieved when the mixture of non-defatted almond flour with a fine particle size and a coarse particle size is not used.

According to one embodiment, the almond flour includes from about 65% to about 90% of a blanched defatted almond protein flour, or from about 70% to about 80%, or from about 72% to about 78%, or about 76%. The blanched defatted almond contains from about 40% to about 60% protein and from about 5% to about 15% fat.

According to one embodiment, the almond flour includes from about 10% to about 20% of a fine blanched almond flour, or from about 12% to about 18%, or from about 13% to about 16%, or from about 14% to about 15%, or about 14.5%. The fine blanched almond flour contains from about 40% to about 60% fat and has a particle size with at least 45% of the fine flour particles being smaller than 600 microns and no more than 10% of the fine flour particles being larger than 850 microns.

According to one embodiment, the almond flour includes from about 5% to about 15% a coarse blanched almond flour, or from about 7% to about 13%, or from about 8% to about 12%, or from about 9% to about 10%, or about 9.5%. The coarse blanched almond flour contains from about 40% to about 60% fat and has a particle size with at least 40% of the coarse flour particles being larger than 850 microns and no more than 10% of the coarse flour particles being smaller than 600 microns.

The source of protein may, in some instances, be from any source, although it has been found that when the source of protein is entirely a plant source that the resulting uncooked dough is too soft and too crumbly to be effectively and efficiently processed. Likewise, it has been found that when the source of protein is entirely a milk protein that the resulting uncooked dough is too stiff and too hard to be effectively and efficiently processed. Accordingly, it has been found that when the dry mix contains a source of protein that includes a mixture of proteins that the resulting uncooked dough will, when further processed, provide the desired organoleptic properties.

In some embodiments, the source of protein includes a combination of one or more milk proteins, one or more plant proteins and one or more seed proteins. In one aspect, the source of proteins may include from about 40% to about 70%, or from about 50% to about 60%, or from about 52% to about 58%, or from about 54% to about 56% of one or more milk proteins. In this aspect, the source of proteins may include from about 15% to about 30%, or about 20% to about 25%, or about 21% to about 23%, or about 22.5% of one or more plant proteins. Further in this aspect, the source of proteins may include from about 15% to about 30%, or about 20% to about 25%, or about 20% to about 22% of one or more seed proteins.

Suitable milk proteins include, but are not limited to whey protein, whey protein concentrate, whey protein isolates, casein including acid casein, rennet casein, and sodium caseinate and mixtures thereof. In some aspects the one or more milk proteins provide at least about 80% protein. In one embodiment, the one or more milk proteins contains at least about 80% protein and has a particle size less than about 300 μm. In one aspect, the one or more milk proteins is rennet casein that contains at least about 80% protein and has a particle size less than about 300 μm.

The one or more plant proteins includes, but is not limited to, spirulina, oats, spelt, teff, quinoa, amaranth, soybeans, edamame, lentils, green peas (also referred to simply as peas), chickpeas, beans, spinach, broccoli, brown rice, wild rice, and mixtures thereof. In one aspect, the one or more plant protein contains at least about 80% protein and has a particle size less than about 100 μm. In one embodiment, the one or more plant protein is a pea protein that contains about 80% protein and has a particle size less than about 75 μm.

Regarding the one or more seed proteins, as used in this description, the seed proteins also include nut proteins. The one or more seed proteins includes, but is not limited to, butternuts, black walnuts, safflower seeds, lotus seeds, hickory nuts, peanuts, pilinuts, ginkgo nuts, acorns, cashews, hazelnuts, pine nuts, pecans, macadamia nuts, beech nuts, hemp seeds, squash seeds, pumpkin seeds, pistachios, sunflower seeds, flax seeds, sesame seeds, chia seeds, and mixtures thereof. In one aspect, the one or more seed protein contains at least about 35% protein and in one embodiment the one or more seed protein is chia seed that contains at least about 35% protein.

According to one embodiment, the dry mix includes a starch. To this end, the starch is an added starch that is not a part of the almond flour or source of protein. The type of starch may include, but is not limited to, native starch, modified starch, pre-gelatinized starch, pre-gelatinized waxy starch, waxy starch, and cold-water swelling starch among others. The starch may be produced from corn (e.g., waxy corn), tapioca, wheat, rice, or potato (e.g., waxy potato), among other sources. In one embodiment, the starch is a waxy potato starch.

The leavening agent may include, but is not limited to sodium bicarbonate (baking soda), sodium carbonate, baking powder, ammonium carbonate, ammonium bicarbonate, yeast, baker's yeast, active dried yeast, baking soda (sodium bicarbonate), potassium bitartrate (cream of tartar), potassium carbonate, potassium bicarbonate, or dipotassium carbonate, alone or in combination.

Referring back to FIG. 1, the dry mix is then transferred to a wet mixer 20 where the dry mix is combined with a sufficient amount of water to form an uncooked snack food dough. Alternatively and as described above, as indicated by reference numeral 25 in FIG. 1, the mixing of dry ingredients and subsequent addition of water to the mix of dry ingredients may occur in the same apparatus to form an uncooked snack food dough. The uncooked snack food dough includes from about 25% to about 50% water with the balance being the dry mix. Importantly, and as noted above, the uncooked snack food dough does not contain any added oil, fat, or emulsifier.

In one embodiment, the uncooked snack food dough includes from about 15% to about 40% of almond flour; from about 25% to about 45% of a source of protein; from about 1% to about 10% of starch; from about 0.1% to about 2% of a leavening agent; and, from about 25% to about 50% of water. In some aspects, the almond flour is present in the uncooked snack food dough in an amount from about 15% to about 40%, or from about 20% to about 30%, or about 24% to about 26%. In some aspects, the source of protein is present in the uncooked snack food dough in an amount from about 25% to about 40%, or from about 30% to about 35%, or from about 32% to about 34%. In some aspects the starch is present in the uncooked snack food dough in an amount from about 0.5% to about 8%, or from about 1% to about 6%, or from about 2% to about 4%, or about 3%. In some aspects, the leavening agent is present in the uncooked snack food dough in an amount from about 0.1% to about 2%, or from about 0.2% to about 1%, or from about 0.3% to about 0.5%. In some aspects, the water is present in the uncooked snack food dough in an amount from about 25% to about 50%, or about 30% to about 45%, or about 36% to about 43%.

The almond flour, source of protein, starch, and leavening agent include those described above for the dry mix. In one aspect, the almond flour present in the uncooked snack food dough includes the same relative amounts and type (i.e., physical properties) of the blanched defatted almond protein flour, the fine blanched almond flour, and the coarse blanched almond flour that are present in the almond flour described above. In other words, the blanched defatted almond protein flour, the fine blanched almond flour, and the coarse blanched almond flour are present in the almond flour for the uncooked snack food dough at the same relative levels (and ratios) as they are in the dry mix described above.

Accordingly, according to one embodiment, the almond flour includes from about 65% to about 90% of a blanched defatted almond protein flour, or from about 70% to about 80%, or from about 72% to about 78%, or about 76%. The blanched defatted almond contains from about 40% to about 60% protein and from about 5% to about 15% fat. According to one embodiment, the almond flour includes from about 10% to about 20% of a fine blanched almond flour, or from about 12% to about 18%, or from about 13% to about 16%, or from about 14% to about 15%, or about 14.5%. The fine blanched almond flour contains from about 40% to about 60% fat and has a particle size with at least 45% of the fine flour particles being smaller than 600 microns and no more than 10% of the fine flour particles being larger than 850 microns. According to one embodiment, the almond flour includes from about 5% to about 15% a coarse blanched almond flour, or from about 7% to about 13%, or from about 8% to about 12%, or from about 9% to about 10%, or about 9.5%. The coarse blanched almond flour contains from about 40% to about 60% fat and has a particle size with at least 40% of the coarse flour particles being larger than 850 microns and no more than 10% of the coarse flour particles being smaller than 600 microns.

In another aspect, the source of protein present in the uncooked snack food dough includes the same amounts and type (i.e., physical properties) of the combination of one or more milk proteins, one or more plant proteins and one or more seed proteins. Accordingly, the source of proteins may include from about 40% to about 70%, or from about 50% to about 60%, or from about 52% to about 58%, or from about 54% to about 56% of one or more milk proteins. In this aspect, the source of proteins may include from about 15% to about 30%, or about 20% to about 25%, or about 21% to about 23%, or about 22.5% of one or more plant proteins. Further in this aspect, the source of proteins may include from about 15% to about 30%, or about 20% to about 25%, or about 20% to about 22% of one or more seed proteins.

Referring back to FIG. 1, the uncooked snack food dough is then sheeted 30 in a known manner. Suitable exemplary sheeting apparatuses are shown and described in US Patent Publication No. 2012/0196010 and U.S. Pat. No. 8,080,273, the portions showing and describing sheeters and sheeting are incorporated herein by reference. Briefly, sheeters typically comprise two or more rollers and can vary in size and can be as large as, or larger than, about 9 feet in length. One or more pairs of rollers are spaced apart to form a gap between the rollers called a nip size. The thickness of the dough can be adjusted by adjusting the nip size. The two rollers rotate in opposite directions, and the dough passes through the gap. The dough is then collected by a third roller or by a conveyor that transports the sheeted dough for subsequent processing, i.e. cutting, puffing, frying, baking, etc. A stripping wire or peeling wire may be held across one of the rollers (the roller upon which the dough adheres immediately after passing through the gap area) to help dislodge the dough or dough pieces from the roller.

Subsequent to sheeting the uncooked snack food dough may be cut 40 into the desired shape including, but not limited to, the characteristic triangular shape of a tortilla, the known round shape, scoops, strips, or any other shape. In some instances, the sheeting and cutting occurs simultaneously as indicated by reference numeral 35 in FIG. 1 to provide an uncooked dough sheet with a plurality of cut pieces. Whether the pieces are cut simultaneous with or subsequent to the sheeting, the uncooked dough sheet has pieces such that ten pieces weigh between about 18 gm to about 30 gm.

Thereafter, the sheeted uncooked dough including cut pieces is conveyed to an oven 50 such as an infrared oven, a convection oven, a gas oven, a high temperature electric oven, or combination gas/electric oven to form a partially dried product. Typically the oven 50 is continuous so that sheeted uncooked dough is exposed to a temperature between about 250° F. and about 650° F. for a period of time from about 1 second to about 60 seconds to form a partially cooked product. One of skill will understand that the temperature and oven dwell time may be determined by the thickness and moisture level of the uncooked sheeted dough.

After oven drying, the partially cooked product is fried 60 in oil to a moisture content of less than about 3%. While any suitable oil for frying may be used, in some aspects it may be desirable to use an oil that is high in monounsaturated fats because almond flour contains polyunsaturated fats and it may be desirable to provide a desired ratio of monounsaturated fatty acids to polyunsaturated fatty acids. In some aspects, the partially cooked product is fried in an oil that is high in monounsaturated fats, i.e., a high oleic oil. In other words, the oil may be high in unsaturated fat, low in saturated fat, with little to no trans fats. Exemplary high oleic oils include, but are not limited to, palm oil, canola, safflower oil, soybean oil, soybean oil, sunflower seed oil, palm kernel oil, peanut oil, cottonseed oil, coconut oil, olive oil, rapeseed oil, and mixtures thereof.

As the person of ordinary skill in the art will appreciate, the temperature of oil, and length of the time the partially cooked product is fried may be adjusted according to the desired outcome. The temperature of the oil may be, for example, in the range of about 300° F. to about 400° F. The length of time the partially cooked product is fried may range, for example, from about 1 second to about 60 seconds to provide a snack food chip having an oil content less than about 55% and a final moisture content of less than about 3% and in some instances between about 0.1% and 3%.

One of skill will appreciate that the oil content of the snack food chip includes oil picked up during frying and oil expressed from the ingredients such as the almond flour and, in this instance it does not include any oil that may be used to adhere seasoning to the snack food chip. Accordingly and as noted above, the snack food chip has an oil content between about 20% about 55%, or about 25% to about 45% of about 30% to about 40%.

In some instances, it may be desirable to apply seasonings to the snack food chip exiting the fryer. In those instances, the snack food chip may be coated with a binder so that applied seasoning 70 will adhere to the snack food chips. To this end, the binder may include but is not limited to an oil and in some instances, the oil may be the same oil as used in the fryer. When a seasoning is applied and oil is used as a binder, the resulting seasoned snack food chip includes from about 15% to about 35% of almond flour, from about 20% to about 40% of a source of protein, from about 1% to about 5% of a starch, from about 0.1% to about 2% of a leavening agent, and, from about 20% to about 55% oil and an amount of seasoning from about 5% to about 15%.

In some embodiments where the snack food chip includes seasoning and, in those instances where the seasoning binder is oil, the seasoned snack food chip contains oil in an amount from about 20% to about 55%, or from about 30% to about 50%, or from about 35% to about 45%. Further, when the snack food chip includes one or more seasonings, the snack food chip may include a total amount of seasoning from about 5% to about 15%, or from about 7% to about 13%, of from about 9% to about 11%.

Seasonings may include, but are not limited to, salt, pepper, spices, flavorings (sweet or savory), chili, garlic, paprika, rosemary, cheese such as nacho (spicy or otherwise), queso, and/or cheddar cheese, ranch, salsa, spicy salsa, lime, buffalo, jalapeno and the like, as well as combinations of the one or more described seasonings.

According to the described method, a snack food chip is produced that comprises from about 15% to about 35% of almond flour; from about 20% to about 40% of a source of protein; from about 1% to about 5% of a starch; from about 0.1% to about 2% of a leavening agent; from about 20% to about 55% of oil; and a moisture content between about 0.1% and about 3%. In some instances, the snack food has a moisture content between about 0.3% about 2%.

In some aspects, the almond flour is present in the snack food chip in an amount from about 15% to about 35%, or from about 20% to about 30%, or from about 22% to about 28%, or from about 24% to about 26%. In some aspects, the source of protein is present in the snack food chip in an amount from about 20% to about 40%, or from about 25% to about 35%, or from about 30% to about 38%%, or from about 31% to about 33%. In some aspects the starch is present in the snack food chip in an amount from about 1% to about 5%, or from about 2% to about 4%, or about 3%. In some aspects, the leavening agent is present in the snack food chip in an amount from about 0.1% to about 2%, or from about 0.2% to about 1%, or from about 0.3% to about 0.7%, or from about 0.4% to about 0.5%. In some aspects, the snack food chip has a moisture content from about 0.1% to about 3% or from about 0.3 to about 2%. In some aspects, the oil is present in the snack food chip without seasoning in an amount from about 20% about 55%, or about 25% to about 45% of about 30% to about 40%.

The almond flour, source of protein, starch, and leavening agent include those described above for the dry mix and the uncooked snack food dough. In one aspect, the almond flour present in the snack food chip includes the same relative amounts and type (i.e., physical properties) of the blanched defatted almond protein flour, the fine blanched almond flour, and the coarse blanched almond flour that are present in the almond flour described above. In other words, the blanched defatted almond protein flour, the fine blanched almond flour, and the coarse blanched almond flour are present in the almond flour for the snack food chip at the same relative levels (and ratios) as they are in the dry mix and the uncooked snack food dough described above.

According to one embodiment, the almond flour present in the snack food chip includes from about 65% to about 90% of a blanched defatted almond protein flour, or from about 70% to about 80%, or from about 72% to about 78%, or about 76%. The blanched defatted almond contains from about 40% to about 60% protein and from about 5% to about 15% fat. According to one embodiment, the almond flour includes from about 10% to about 20% of a fine blanched almond flour, or from about 12% to about 18%, or from about 13% to about 16%, or from about 14% to about 15%, or about 14.5%. The fine blanched almond flour contains from about 40% to about 60% fat and has a particle size with at least 45% of the fine flour particles being smaller than 600 microns and no more than 10% of the fine flour particles being larger than 850 microns. According to one embodiment, the almond flour includes from about 5% to about 15% a coarse blanched almond flour, or from about 7% to about 13%, or from about 8% to about 12%, or from about 9% to about 10%, or about 9.5%. The coarse blanched almond flour contains from about 40% to about 60% fat and has a particle size with at least 40% of the coarse flour particles being larger than 850 microns and no more than 10% of the coarse flour particles being smaller than 600 microns.

In one embodiment, the snack food chip includes from about 10% to about 30% of the blanched defatted almond protein flour described above, or from about 15% to about 25%, or from about 17% to about 20%, or from about 18% to about 19% of the blanched defatted almond protein flour described above. In some embodiments, the snack food chip includes from about 0.5% to about 7% of the fine blanched almond flour described above, or from about 1% to about 5%, or from about 2% to about 4% of the fine blanched almond flour described above. In other embodiments, the snack food chip includes from about 0.5% to about 5% of the coarse blanched almond flour described above, or from about 1% to about 4%, or from about 2% to about 3% of the coarse blanched almond flour.

In another aspect, the source of protein present in the snack food chip includes the same relative amounts and type (i.e., physical properties) of the combination of one or more milk proteins, one or more plant proteins and one or more seed proteins that are described above with respect to the dry mix and the uncooked snack food dough. Accordingly, the source of proteins in the snack food chip may include from about 40% to about 70%, or from about 50% to about 60%, or from about 52% to about 58%, or from about 54% to about 56% of one or more milk proteins. In this aspect, the source of proteins may include from about 15% to about 30%, or about 20% to about 25%, or about 21% to about 23%, or about 22.5% of one or more plant proteins. Further in this aspect, the source of proteins may include from about 15% to about 30%, or about 20% to about 25%, or about 20% to about 22% of one or more seed proteins.

In one embodiment, the snack food chip includes from about 10% to about 30% of the one or more milk proteins described above, of from about 15% to about 25%, or from about 16% to about 20%, or from about 17% to about 18% of the one or more milk proteins described above. In some embodiments, the snack food chip includes from about 1% to about 15% of the one or more plant proteins described above, or from about 3% to about 10%, or from about 5% to about 9%, of from about 6% to about 8% of the one or more plant proteins described above. In other embodiments, the snack food chip includes from about 1% to about 15% of the one or more seed proteins described above, or from about 3% to about 10%, or from about 5% to about 9%, of from about 6% to about 8% of the one or more seed proteins described above.

Advantageously, the snack food chip described above that contains the above-described amounts of the described ingredients formulated in the described balanced manner, provides an organoleptically pleasing snack food with a desirable hardness and crispy texture. Further, in one embodiment, one serving of the snack food chip (whether seasoning is present or not) contains about 1 gram to about 6 grams net carbohydrates, or from about 1 gram to about 5 grams, or from about 1 gram to about 4 grams, or from about 1 gram to about 3 grams net carbohydrates. In one embodiment, one serving of the snack food chip (whether seasoning is present or not) contains from about 5 grams to about 15 grams of protein, or from about 6 grams to about 14 grams, or from about 7 grams to about 13 grams, or about 8 grams to about 12 grams of protein.

As used in this description the term "comprising" is synonymous with "including," "containing," or "characterized by," and is inclusive or open-ended and does not exclude additional, un-recited ingredients or method steps and it is contemplated and one of skill will appreciate that in those instances where "comprising", "including", etc. are recited, those terms could be replaced with the phrase "consisting essentially of" or "consisting of". To that end, one of skill will appreciate that the term, "consisting of" excludes any element, step, or ingredient not specified in the claim element and that the term, "consisting essentially of" does not exclude materials or steps that do not materially affect the basic and novel characteristics of the claim. Accordingly, in each instance of this description, any of the terms "comprising", "consisting essentially of" and "consisting of" may be replaced with either of the other two terms.

When a group of substituents is disclosed herein, it is understood that all individual members of that group and all subgroups, are disclosed separately. When a Markush group or other grouping is used, all individual members of the group and all combinations and subcombinations possible of the group are intended to be individually included in the disclosure.

Every combination of components or ingredient described or exemplified in the above description can be used to practice the invention, unless otherwise stated.

Whenever a range is given in the specification, for example, a size range, an temperature range, a time range, or an amount range, all intermediate ranges and subranges, as well as all individual values included in the ranges given are intended to be included. It will be understood that any subranges or individual values in a range or subrange that are included in the description can be excluded from the claims.

In accordance with the above description, Aspects of the described dry mix, uncooked snack food dough, snack food chip, and method of making the snack food chip are also set out in the following set of numbered clauses, in which is described:

Clause 1: A dry mix, when combined with water forms an uncooked dough for a snack chip, the dry mix comprising:
from about 30% to about 50% of almond flour;
from about 30% to about 80% of a source of protein;
from about 1% to about 10% of a starch; and
from about 0.1% to about 3% of a leavening agent.

2. The dry mix according to clause 1, wherein the almond flour includes:
from about 65% to about 90% of a blanched defatted almond protein flour that contains from about 40% to about 60% protein and from about 5% to about 15% fat;
from about 10% to about 20% of a fine blanched almond flour that contains from about 40% to about 60% fat and that has a particle size with at least 45% of the fine flour particles being smaller than 600 microns; and,
from about 5% to about 15% a coarse blanched almond flour that contains from about 40% to about 60% fat and that has a particle size with at least 40% of the coarse flour particles being larger than 850 microns and no more than 10% of the coarse flour particles being smaller than 600 microns.

3. The dry mix according to the preceding clauses wherein the source of protein includes a combination of one or more milk proteins, one or more plant proteins and one or more seed proteins.

4. The dry mix according to clause 3 wherein the source of protein comprises:
from about 40% to about 70% of one or more milk proteins;
from about 15% to about 30% of one or more plant proteins; and
from about 15% to about 30% of one or more seed proteins.

5. The dry mix according to clause 3 or 4 wherein the one or milk proteins comprises casein.

6. The dry mix according to any one of clauses 3, 4, or 5 wherein the one or more plant proteins comprises pea protein.

7. The dry mix according to any of clauses 3, 4, 5, or 6 wherein the one or more seed proteins includes chia seed.

8. The dry mix according to any of the preceding clauses wherein the starch comprises potato starch.

9. The dry mix according to any of the preceding clauses wherein the leavening agent is sodium bicarbonate.

10. An uncooked snack food dough comprising:
from about 15% to about 40% of almond flour;
from about 25% to about 45% of a source of protein;
from about 1% to about 10% of starch;
from about 0.1% to about 2% of a leavening agent; and,
from about 25% to about 50% of water.

11. The uncooked snack food dough according to clause 10, wherein the almond flour includes
from about 65% to about 90% of a blanched defatted almond protein flour that contains from about 40% to about 60% protein and from about 5% to about 15% fat;
from about 10% to about 20% of a fine blanched almond flour that contains from about 40% to about 60% fat and that has a particle size with at least 45% of the fine flour particles being smaller than 600 microns; and,
from about 5% to about 15% a coarse blanched almond flour that contains from about 40% to about 60% fat and that has a particle size with at least 40% of the coarse flour particles being larger than 850 microns and no more than 10% of the coarse flour particles being smaller than 600 microns.

12. The uncooked snack food dough according to clause 10 or 11 wherein the source of protein includes a combination of one or more milk proteins, one or more plant proteins and one or more seed proteins.

13. The uncooked snack food dough according to any one of clauses 10, 11, or 12 wherein the source of protein comprises:
from about 40% to about 70% of one or more milk proteins;
from about 15% to about 30% of one or more plant proteins; and
from about 15% to about 30% of one or more seed proteins.

14. The uncooked snack food dough according to clause 12 or 13 wherein the one or milk proteins comprises casein.

15. The uncooked snack food dough according to any one of clauses 10 thru 14 wherein the one or more plant proteins comprises pea protein.

16. The uncooked snack food dough according to any of clauses 10 thru 15 wherein the one or more seed proteins includes chia seed.

17. The uncooked snack food dough according to any of clauses 10 thru 16 wherein the starch comprises potato starch.

18. The uncooked snack food dough according to any of clauses 10 thru 17 wherein the leavening agent is sodium bicarbonate.

19. A snack food chip comprising:
from about 15% to about 35% of almond flour;
from about 20% to about 40% of a source of protein;
from about 1% to about 5% of a starch;
from about 0.1% to about 2% of a leavening agent; and,
from about 20% to about 55% of oil;
wherein the snack food chip has a moisture content between about 0.1% and about 3%.

20. The snack food chip according to clause 19 wherein the almond flour includes
from about 65% to about 90% of a blanched defatted almond protein flour that contains from about 40% to about 60% protein and from about 5% to about 15% fat;
from about 10% to about 20% of a fine blanched almond flour that contains from about 40% to about 60% fat and that has a particle size with at least 45% of the fine flour particles being smaller than 600 microns; and,
from about 5% to about 15% a coarse blanched almond flour that contains from about 40% to about 60% fat and that has a particle size with at least 40% of the coarse flour particles being larger than 850 microns and no more than 10% of the coarse flour particles being smaller than 600 microns.

21. The snack food chip according to clauses 19 or 20 wherein the source of protein includes a combination of one or more milk proteins, one or more plant proteins and one or more seed proteins.

22. The snack food chip according to any one of clauses 19 thru 21 wherein the source of protein comprises:
from about 40% to about 70% of one or more milk proteins;
from about 15% to about 30% of one or more plant proteins; and from about 15% to about 30% of one or more seed proteins.

23. The snack food chip according to any one of clauses 19 thru 22 wherein the one or milk proteins comprises casein.

24. The snack food chip according to any one of clauses 19 thru 23 wherein the one or more plant proteins comprises pea protein.

25. The snack food chip according to any one of clauses 19 thru 24 wherein the one or more seed proteins includes chia seed.

26. The snack food chip according to any one of clauses 19 thru 25 wherein the starch comprises potato starch.

27. The snack food chip according to any one of clauses 19 thru 26 wherein the leavening agent is sodium bicarbonate.

28. The snack food chip according to any one of clauses 19 thru 27 wherein the oil is a high oleic oil.

29. The snack food chip according to clause 28 wherein the high oleic oil is selected from the group comprising palm oil, soybean oil, sunflower seed oil, palm kernel oil, peanut oil, cottonseed oil, coconut oil, olive oil, rapeseed oil, and mixtures thereof.

30. The snack food chip according to any one of clauses 19 thru 29 further comprising from about 5% to about 15% of one or more seasonings.

31. The snack food chip according to any one of clauses 19 thru 30 wherein 28 grams of the snack food chip contains less than about 6 grams net carbohydrates and from about 5 to about 15 grams of protein.

32. A method of making a snack food chip comprising:
providing an uncooked dough that includes from about 15% to about 40% of almond flour; from about 25% to about 45% of a source of protein; from about 1% to about 10% of starch; from about 0.1% to about 2% of a leavening agent; and, from about 25% to about 50% of water;
sheeting the uncooked dough to form an uncooked dough sheet;
partially cooking the uncooked dough sheet for at a temperature between about 250° F. and about 650° F. for a period of time between about 1 second and about 60 seconds to form a partially cooked product;
frying the partially cooked product in oil at a temperature between about between about 300° F. and about 400° F. for a period of time between about 1 second and about 60 seconds to provide a snack food chip having a moisture content less than about 3%.

33. The method according to clause 32 wherein the uncooked dough sheet comprises a plurality of cut pieces such that ten cut pieces have a weight between 18 grams and 30 grams.

34. The method according to any one of clauses 32 thru 34 wherein the oil is a high oleic sunflower oil.

35. The method according to any one of clauses 32 thru 35 further comprising applying seasoning to the snack food chip.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A dry mix, when combined with water forms an uncooked dough for a snack chip, the dry mix comprising:
   (a) from about 30% to about 50% of almond flour, wherein the almond flour includes
      (i) from about 65% to about 90% of a blanched defatted almond protein flour that contains from about 40% to about 60% protein and from about 5% to about 15% fat;
      (ii) from about 10% to about 20% of a fine blanched non-defatted almond flour that contains from about 40% to about 60% fat and that has a particle size with at least 45% of the fine flour particles being smaller than 600 microns; and
      (iii) from about 5% to about 15% a coarse blanched non-defatted almond flour that contains from about 40% to about 60% fat and that has a particle size with at least 40% of the coarse flour particles being larger than 850 microns and no more than 10% of the coarse flour particles being smaller than 600 microns;
   (b) from about 30% to about 80% of a source of protein, wherein the source of protein includes from about 40% to about 70% of one or more milk proteins, from about 15% to about 30% of one or more plant proteins, and from about 15% to about 30% of one or more seed proteins;
   (c) from about 1% to about 10% of a starch; and
   (d) from about 0.1% to about 3% of a leavening agent.

2. The dry mix according to claim 1 wherein the one or milk proteins comprises casein.

3. The dry mix according to claim 1 wherein the one or more plant proteins comprises pea protein.

4. The dry mix according to claim 1 wherein the one or more seed proteins includes chia seed.

5. An uncooked snack food dough comprising:
   (a) from about 15% to about 40% of almond flour, wherein the almond flour includes
      (i) from about 65% to about 90% of a blanched defatted almond protein flour that contains from about 40% to about 60% protein and from about 5% to about 15% fat;
      (ii) from about 10% to about 20% of a fine blanched non-defatted almond flour that contains from about 40% to about 60% fat and that has a particle size with at least 45% of the fine flour particles being smaller than 600 microns; and
      (iii) from about 5% to about 15% a coarse blanched non-defatted almond flour that contains from about 40% to about 60% fat and that has a particle size with at least 40% of the coarse flour particles being larger than 850 microns and no more than 10% of the coarse flour particles being smaller than 600 microns;
   (b) from about 25% to about 45% of a source of protein, wherein the source of protein includes from about 40% to about 70% of one or more milk proteins, from about 15% to about 30% of one or more plant proteins, and from about 15% to about 30% of one or more seed proteins;
   (c) from about 1% to about 10% of starch;
   (d) from about 0.1% to about 2% of a leavening agent; and
   (e) from about 25% to about 50% of water.

6. A snack food chip comprising:
   (a) from about 15% to about 35% of almond flour, wherein the almond flour includes (i) from about 65% to about 90% of a blanched defatted almond protein flour that contains from about 40% to about 60% protein and from about 5% to about 15% fat;
(ii) from about 10% to about 20% of a fine blanched non-defatted almond flour that contains from about 40% to about 60% fat and that has a particle size with at least 45% of the fine flour particles being smaller than 600 microns; and
(iii) from about 5% to about 15% a coarse blanched non-defatted almond flour that contains from about 40% to about 60% fat and that has a particle size with at least 40% of the coarse flour particles being larger than 850 microns and no more than 10% of the coarse flour particles being smaller than 600 microns;
(b) from about 20% to about 40% of a source of protein, wherein the source of protein includes from about 40% to about 70% of one or more milk proteins, from about 15% to about 30% of one or more plant proteins, and from about 15% to about 30% of one or more seed proteins;
(c) from about 1% to about 5% of a starch;
(d) from about 0.1% to about 2% of a leavening agent; and
(e) from about 20% to about 55% of oil;
wherein the snack food chip has a moisture content between about 0.1% and about 3%.

7. The snack food chip according to claim 6 wherein the one or milk proteins comprises casein.

8. The snack food chip according to claim 6 wherein the one or more plant proteins comprises pea protein.

9. The snack food chip according to claim 6 wherein the one or more seed proteins includes chia seed.

10. The snack food chip according to claim 6 further comprising from about 5% to about 15% of one or more seasonings.

11. The snack food chip according to claim 6 wherein 28 grams of the snack food chip contains less than about 6 grams net carbohydrates and from about 5 to about 15 grams of protein.

12. A method of making a snack food chip comprising:
(a) providing an uncooked dough that includes from about 15% to about 40% of almond flour; from about 25% to about 45% of a source of protein, wherein the source of protein includes from about 40% to about 70% of one or more milk proteins, from about 15% to about 30% of one or more of proteins, and from about 15% to about 30% of one or more seed proteins; from about 1% to about 10% of starch; from about 0.1% to about 2% of a leavening agent; and, from about 25% to about 50% of water, wherein the almond flour includes
(i) from about 65% to about 90% of a blanched defatted almond protein flour that contains from about 40% to about 60% protein and from about 5% to about 15% fat;
(ii) from about 10% to about 20% of a fine blanched non-defatted almond flour that contains from about 40% to about 60% fat and that has a particle size with at least 45% of the fine flour particles being smaller than 600 microns; and
(iii) from about 5% to about 15% a coarse blanched non-defatted almond flour that contains from about 40% to about 60% fat and that has a particle size with at least 40% of the coarse flour particles being larger than 850 microns and no more than 10% of the coarse flour particles being smaller than 600 microns;
(b) sheeting the uncooked dough to form an uncooked dough sheet;
(c) partially cooking the uncooked dough sheet at a temperature between about 250° F. and about 650° F. for a period of time between about 1 second and about 60 seconds to form a partially cooked product; and
(d) frying the partially cooked product in oil at a temperature between about between about 300° F. and about 400° F. for a period of time between about 1 second and about 60 seconds to provide a snack food chip having a moisture content less than about 3%.

13. The method according to claim 12 further comprising cutting the uncooked dough sheet into a plurality of pieces prior to partially cooking.

14. The method according to claim 12 further comprising applying seasoning to the snack food chip.

* * * * *